(12) United States Patent
Nagakubo et al.

(10) Patent No.: US 6,971,782 B2
(45) Date of Patent: Dec. 6, 2005

(54) ILLUMINATION DEVICE AND LIQUID CRYSTAL DISPLAY DEVICE

(75) Inventors: Hideaki Nagakubo, Fukushima-ken (JP); Norikazu Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 50 days.

(21) Appl. No.: 10/716,374

(22) Filed: Nov. 18, 2003

(65) Prior Publication Data

US 2004/0141304 A1 Jul. 22, 2004

(30) Foreign Application Priority Data

Nov. 19, 2002 (JP) ............................. 2002-334994

(51) Int. Cl.[7] ................................. F21V 7/04
(52) U.S. Cl. ..................... 362/625; 362/626; 362/600; 362/623; 362/348
(58) Field of Search .................... 362/31, 600, 606, 362/607, 608, 623, 625, 626, 297, 342, 348; 349/67, 62

(56) References Cited

U.S. PATENT DOCUMENTS

| 4,779,137 A | * | 10/1988 | Tojo et al. ................ 348/229.1 |
| 4,874,228 A | * | 10/1989 | Aho et al. ..................... 349/62 |
| 6,181,396 B1 | * | 1/2001 | Kanoh et al. ................ 349/113 |
| 6,213,625 B1 | * | 4/2001 | Leadford et al. ............ 362/331 |
| 6,692,137 B2 | * | 2/2004 | Blanchard .................... 362/241 |
| 6,755,546 B2 | * | 6/2004 | Ohkawa ....................... 362/626 |
| 2003/0227768 A1 | * | 12/2003 | Hara et al. ..................... 362/31 |
| 2004/0105157 A1 | * | 6/2004 | Matsushita et al. .......... 359/584 |

FOREIGN PATENT DOCUMENTS

JP 3277178 9/2001

* cited by examiner

Primary Examiner—Stephen Husar
Assistant Examiner—Anabel Ton
(74) Attorney, Agent, or Firm—Brinks Hofer Gilson & Lione (57) ABSTRACT

An illumination device includes a light source and a planar illuminator for emitting light of the light source portion from one surface thereby to illuminate a liquid crystal panel. The planar illuminator has a reflection surface, on which minute concavo-convex shapes are substantially randomly formed. Surface emission is performed by diffuse reflecting the light irradiated from the light source portion by the reflection surface.

33 Claims, 8 Drawing Sheets

ILLUMINATION DEVICE AND LIQUID CRYSTAL DISPLAY DEVICE

This application claims the benefit of priority to Japanese Patent Application 2002-334994, filed on Nov. 19, 2002.

BACKGROUND OF THE INVENTION

1. Field of the Invention

The present invention relates to an illumination device and a liquid crystal display device.

2. Description of the Related Art

Illumination device such as a frontlight and a backlight used for liquid crystal display device basically include a light guide plate and a light source disposed on the side section of the light guide plate. Light incident from the side sections of the light guide plates is reflected by a prism formed on the opposite sides to the emission surfaces of the light guide plates and is emitted from the emission surfaces. As a result, the illumination devices illuminate illuminated objects such as liquid crystal panels. It is suggested that the traveling direction of the light incident on the liquid crystal panels be controlled and that display brightness be improved by disposing prism sheets between the light guide plates and the liquid crystal panels (for example, Patent Document 1).

Figure 15:
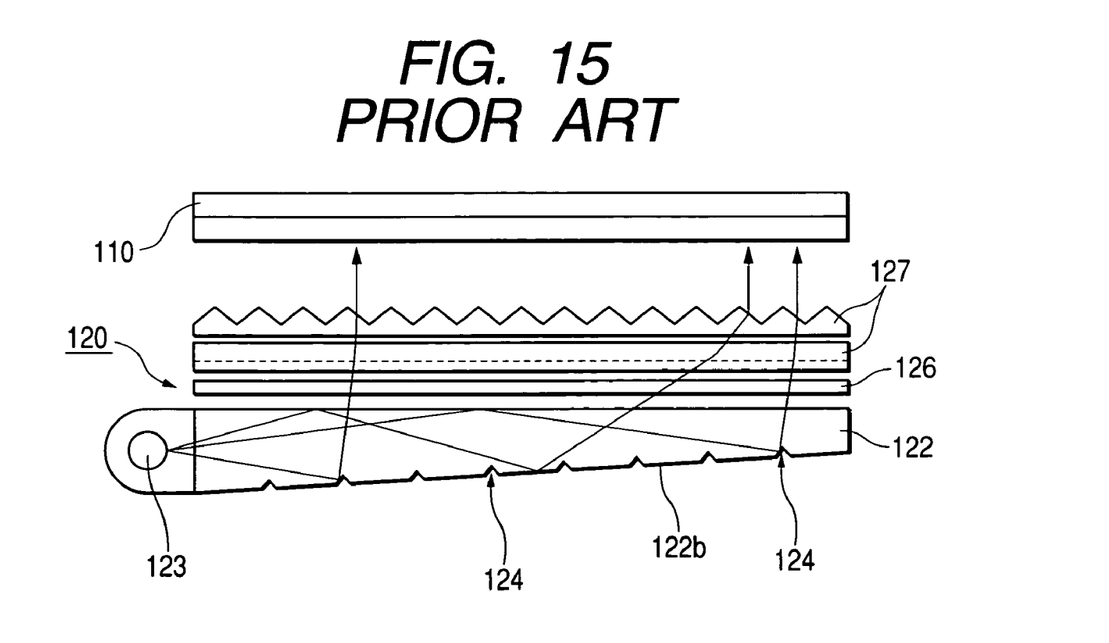
FIG. 15 is a sectional view illustrating an example of a conventional liquid crystal display device.

FIG. 15 illustrates an example of a section of a liquid crystal display device having the above structure. The liquid crystal display device illustrated in FIG. 15 includes a liquid crystal panel 110 and a backlight 120 disposed in the rear side of (below the liquid crystal panel in FIG. 15) the liquid crystal panel 110. The liquid crystal panel 110 is transmissive type with no reflection layer or transflective type with a reflection layer partially disposed in a pixel region. In the backlight 120, reference numerals 122 and 123 denote a light guide plate and a cold cathode fluorescence lamp. A plurality of grooves 124 having wedge-shaped sections are formed at a lower surface 122b of the light guide plate 122. A light scattering plate 126 and two prism sheets 127 are arranged between the light guide plate 122 and the liquid crystal panel 110.

[Patent Document 1]
Japanese Patent No. 3277178

The backlight 120 included in the liquid crystal display device illustrated in FIG. 15 guides the light emitted from the cold cathode fluorescence lamp 123 to the inside of the light guide plate 122 and reflects the light transmitted to the inside the light guide plate 122 from the internal surfaces of the grooves 124, thereby to emit light to the liquid crystal panel 110. The light emitted from the top face of the light guide plate 122 is scattered by the light scattering plate 126 and changes the traveling direction thereof by the two prism sheets 127 so that the traveling direction can be changed substantially perpendicular to the liquid crystal panel 110 thereby to be incident on the liquid crystal panel 110. As a result, the,light is used as display light.

The structure of the backlight 120 illustrated in FIG. 15 is currently and commonly used. However, in such a kind of backlight, a large amount of components emitted at an angle so as to deviate from the direction perpendicular to the light guide plate 122 is included in the light emitted from the light guide plate 122 to the liquid crystal panel 110. Therefore, there is a problem in that the utilization efficiency of the light emitted from the backlight 120 decreases. In order to solve the above problem, the prism sheets 127 for directing the light emitted from the backlight 120 toward the direction perpendicular to the light guide plate are arranged between the light guide plate 122 and the liquid crystal panel 110.

However, in a structure where a plurality of optical devices is laminated, it is difficult to make the liquid crystal display device light. Also, the manufacturing cost increases due to an increase in the number of parts of liquid crystal display device. In particular, the prism sheet is extremely expensive, which is a factor for increasing the price of the conventional backlight systems.

In a method of guiding the light from the cold cathode fluorescence lamp 123 to the inside of the light guide plate 122 and reflecting the light from the grooves 124 of the light guide plate 122, some components of the light may be lost inside light guide plate 122. Therefore, it is difficult to improve the utilization efficiency of light.

SUMMARY OF THE INVENTION

Accordingly, in order to solve the above problems, it is an object of the present invention to provide an illumination device capable of being manufactured at small expenses and of being easily made lightwieght, thereby not creating loss of light.

An illumination device according to the present invention comprises a light source and a planar illuminator for illuminating an illuminated object by emitting light of the light source from one surface, the planar illuminator has a reflection surface, on which minute concavo-convex shapes are substantially randomly formed, and light irradiated from the light source is diffusively reflected by the reflection surface thereby to perform surface emission.

The illumination device having the above structure illuminates the illuminated object such as a liquid crystal panel by reflecting the light illuminated from the light source by the planar illuminator having the reflection surface for diffusing and reflecting incident light. In a conventional illumination device, as illustrated in FIG. 15, in order to use light from a linear light source or a point light source as a planar light source, a transparent light guide plate 122 is used. However, a molded product such as acrylic resin is used as the light guide plate. In particular, when the illumination device is enlarged, significant increase in the weight of the illumination device is caused. In the illumination device according to the present invention, the planar illuminator having diffusively reflection functions caused by minute concavo-convex shapes is used for making a linear light source or a point light source as a planar light source. Therefore, in order to obtain the function as the planar illuminator, at least the reflection surface is preferably included. As a result, it is possible to easily make the illumination device thin. Also, it is possible to make the illumination device light.

In the illumination device according to the present invention, the light source is arranged at a side of the planar illuminator, and a reflection surface of the planar illuminator is a tilted surface that rises as the reflection surface becomes more distant from the light source.

According to the above structure, it is possible to provide an illumination device which can be used instead of the conventional backlight, in which the light source is disposed on the side section of the light guide plate that is a planar light emitting portion. In the above structure, the light emitted from the light source is transferred in the air and reaches the reflection surface of the planar illuminator. The light is diffusively reflected on the reflection surface and, at the same time, the direction of the light changes to travel over the planar illuminator, thereby to illuminate the illuminated object.

In the illumination device according to the present invention, a prism-shaped prism sheet is disposed between the reflection surface of the planar illuminator and an illuminated object.

According to the above structure, it is possible to condense the illumination light diffusively reflected on the reflection surface and incident on the illuminated object to a predetermined direction. Therefore, it is possible to improve substantial illumination brightness.

In the illumination device according to the present invention, the prism sheet controls the directivity of at least two light components, which travels in different directions in plan view.

According to the structure, it is possible to further increase the concentration of the illumination light and thereby to further improve the brightness of the condensed light. Therefore, it is possible to obtain illumination light having higher brightness.

In the illumination device according to the present invention, the prism sheet has a prism shape where a plurality of polypyramid-shaped or conical protrusions is formed.

According to the above structure, it is possible to efficiently condense light components having a plurality of traveling directions in a plane to a predetermined direction and to substantially obtain illumination light having high brightness.

In the illumination device according to the present invention, the vertical angle of the polypyramid-shaped or conical protrusion is in the range of 70° to 110° and the vertical angle of the polypyramid-shaped or conical protrusion is in the range of 80° to 100°.

It is possible to efficiently emit light components having a plurality of traveling directions in a plane to a direction perpendicular to the prism sheet by making the vertical angle of the protrusion be in the above range. In particular, when the illuminated object is the liquid crystal panel, it is possible to form a liquid crystal display device capable of displaying image with high brightness.

In the illumination device according to the present invention, the protrusion has any one of a quadrangular pyramid, a hexangular pyramid, and an octangular pyramid.

According to the above structure, it is possible to provide an illumination device, by which it is possible to uniformly control directivity of the light components that pass through the prism sheet within the prism face and to improve uniformity of the emitted light.

In the illumination device according to the present invention, the light source is a cold cathode fluorescence lamp and the light source is an LED or an LED array. There is not limited in the light source applied to the illumination device according to the present invention. Any light source used as the conventional back or frontlight may be used. In order to make the illumination device thin and lightweight, it is preferable to use a light source with the LED (a light emitting diode).

In the illumination device according to the present invention, the light source comprises a substantially rod-shaped light guider and a light emitting element disposed at the end of the longitudinal direction of the light guider, the light guider introduces light of the light emitting element from one end thereof to the inside thereof and emits the light to an emission surface disposed on one side, a side opposite to the emission surface of the light guider is curved, and a plurality of grooves extended to the peripheral direction of the light guide is formed along the curve.

According to the above structure, it is possible to change the light emitting element that is the point light source into the linear light source by the light guider and thereby to irradiate the planar illuminator. Therefore, it is possible to provide an illumination device, in which the point light source is used and the amount of the light emitted from a light emission surface is uniform.

In the illumination device according to the present invention, the reflection surface is formed on the tilted surface that rises according to the distance as the tilted surface becomes far from the light guider. Therefore, in the emission characteristics of the light guider, main components are preferably distributed to the front direction of an emission surface. It is preferable that the amount of the components emitted from the front of the emission surface to the vertical direction of the emission surface be relatively small. According to the light guider having the above structure, it is possible to easily obtain emitted light having the related distribution.

In the illumination device according to the present invention, the pitches of the plurality of grooves formed in the light guide gradually become narrower from the side where the light emitting element is disposed and the depths of the grooves gradually become deeper.

According to the above structure, it is possible to provide an illumination device capable of making uniform the distribution of the amount of emitted light to a direction, to which the light guider is extended and of obtaining uniform illumination light in a surface of the planar illuminator.

In the liquid crystal device according to the present invention, the illumination device according to the claims is disposed in the rear side of the liquid crystal panel. According to the above structure, it is possible to provide a thin and light liquid crystal display device capable of displaying images with high brightness by including the illumination device according to the present invention capable of being easily made thin and light.

DESCRIPTION OF THE PREFERRED EMBODIMENTS

An embodiment of the present invention will now be described with reference to drawings.

Figure 1:
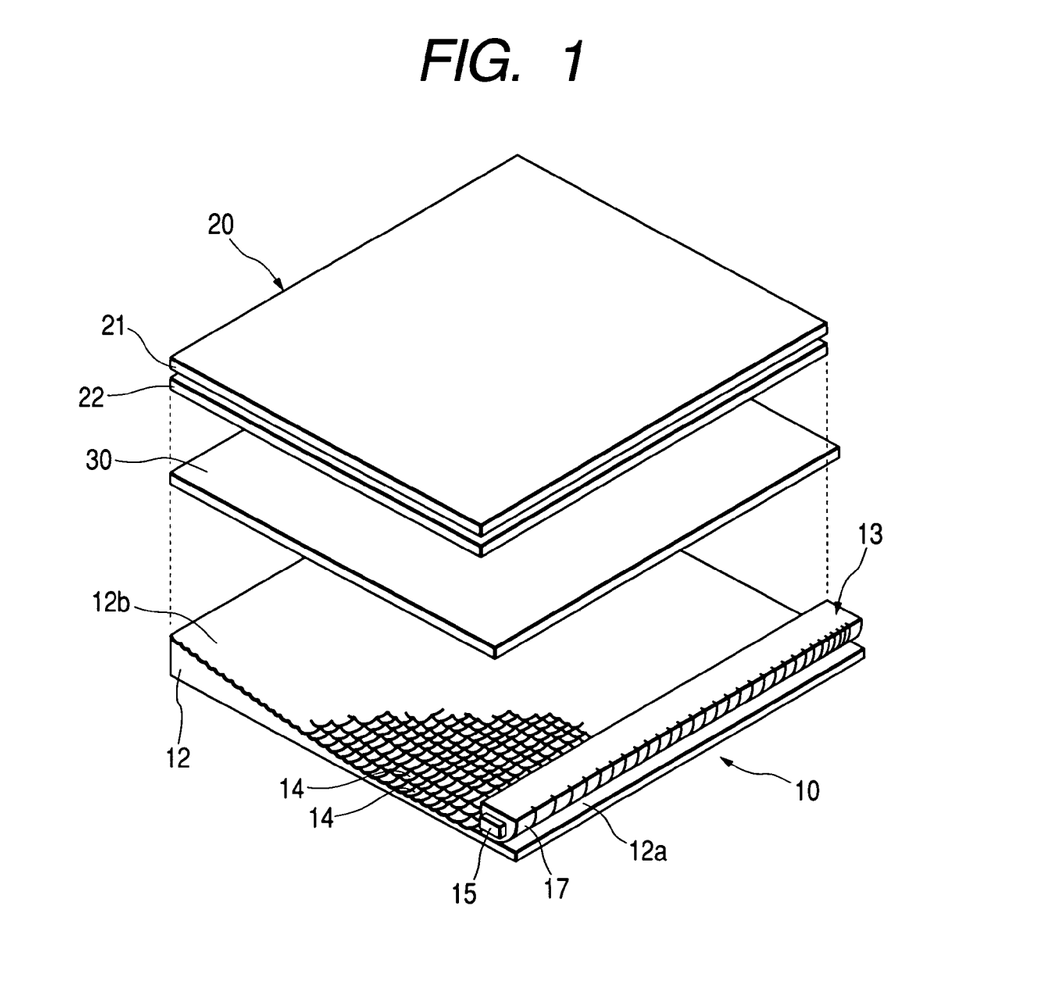
FIG. 1 is a perspective view of a liquid crystal display device according to an embodiment of the present invention.
Figure 2:
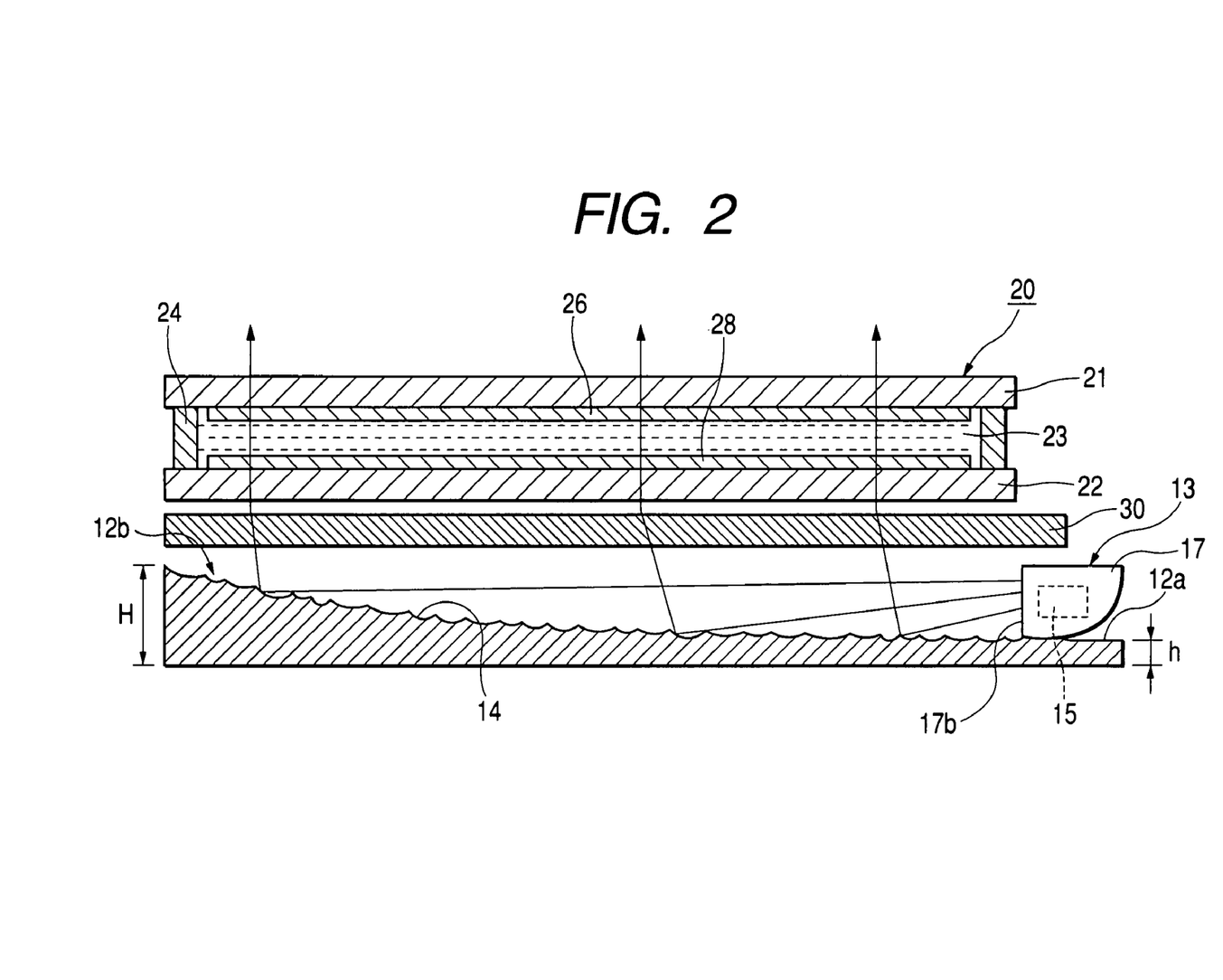
FIG. 2 is a sectional view of the liquid crystal display device illustrated in FIG. 1.

FIG. 1 is a perspective view of a liquid crystal display device according to an embodiment of the present invention. FIG. 2 is a sectional view of the liquid crystal display device illustrated in FIG. 1. The liquid crystal display device according to the embodiment, as illustrated in FIGS. 1 and 2, includes a liquid crystal panel 20 and a backlight (an illumination device) 10 arranged on the rear side of (below the liquid crystal panel in Figure) the liquid crystal panel 20. In the liquid crystal display device according to the present embodiment, optical means 30 having a light diffusing function or a directivity controlling function is arranged between the liquid crystal panel 20 and the backlight 10.

The backlight 10 includes a planar illuminator 12 having a reflection surface 12b formed at its upper surface, and a light source portion (a light source) 13 arranged on a light source arranging portion 12a disposed at the end of the upper surface. The liquid crystal panel 20 is a transmissive or transflective liquid crystal display device that includes an upper substrate 21 and a lower substrate 22 arranged to face each other. Pixels (not shown) are formed in a matrix.

In the liquid crystal display device having the above structure, the planar illuminator 12 is arranged on the rear side of the liquid crystal panel 20. The planar illuminator 12 reflects the light emitted from the light source portion 13, thereby to illuminate the liquid crystal panel 20 and to recognize images displayed on the liquid crystal panel 20. Also, under the periphery where the external light such as sunlight is incident, the external light may be reflected by the reflection surface 12b of the planar illuminator 12, thereby to be used as display light.

If the liquid crystal panel 20 is transflective type, it is possible to display images by reflecting the external light by a reflection layer formed in the liquid crystal panel 20.

Structures of the respective portions of the liquid crystal display device according to the embodiment will now be described in detail.

<Backlight>

The backlight 10 according to the present embodiment, as illustrated in FIGS. 1 and 2, includes the planar illuminator 12 and the light source portion 13 disposed at the side end of the planar illuminator 12 as main components. The planar illuminator 12 has the reflection surface 12b tilted so as to rise from the light source arranging portion 12a for arranging the light source portion 13 to a side that faces the side, on which the light source arranging portion 12a is formed. A plurality of minute concave portions 14 is randomly and continuously formed on the reflection surface 12b. As illustrated in FIG. 2, the thickness H of the planar illuminator 12 at the end of the facing side formed thicker than the thickness h of the planar illuminator 12 in the light source arranging portion 12a. The surface of the light source arranging portion 12a is substantially a flat plane in the planar illuminator 12 according to the embodiment. The planar illuminator 12 is obtained by forming a metal reflection film such as Al and Ag in one side of transparent resin such as polycarbonate resin mixed with Ti particles and acrylic resin.

Figure 3:
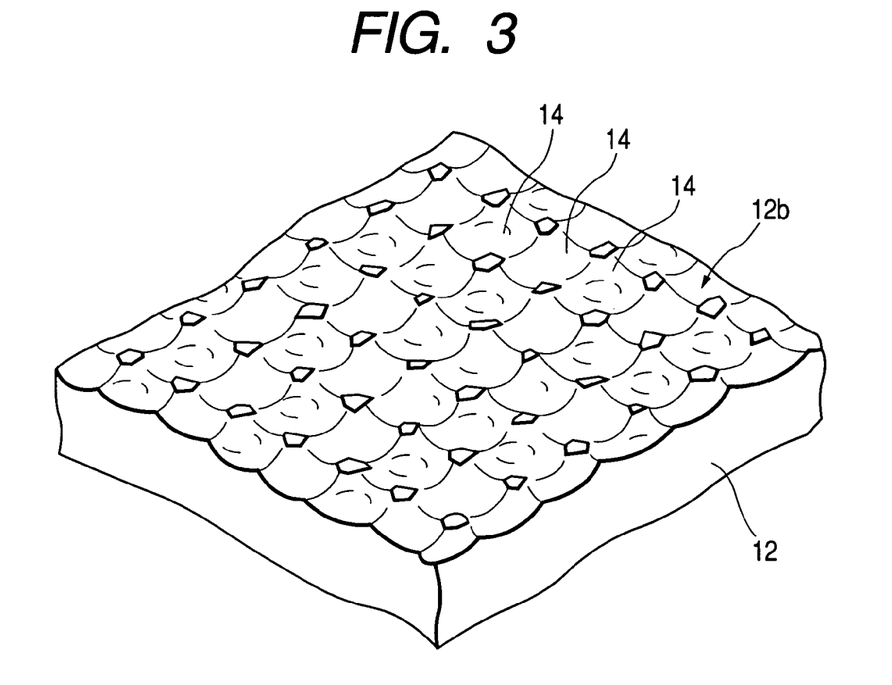
FIG. 3 is a partial perspective view illustrating an enlargement of a reflection surface of a planar illuminator illustrated in FIG. 1.

FIG. 3 is a partial perspective view illustrating an enlargement of the reflection surface 12b of the planar illuminator 12 illustrated in FIG. 1. As illustrated in FIG. 3, the plurality of concave portions 14 having substantially spherical concave surfaces is formed on the surface of the planar illuminator 12. In the illustrated example, the adjacent concave portions 14 are continuously formed so as to partially overlap each other.

The shape of the reflection surface 12b illustrated in FIGS. 1 and 3 is an example. It is preferable that the shape, the depth, and the pitch of the concave portions 14 be appropriately changed so as to obtain appropriate reflection characteristics in accordance with the structure of the light source portion 13 assembled with the planar illuminator 12 or the structure of the illuminated object assembled with the backlight 10. The shapes applied to the concave portions 14 will now be described.

According to the embodiment, the light source arranging portion 12a is a substantially flat plane. However, the region of the reflection surface 12b, in which the concavo-convex shapes are formed, may be extended to the light source arranging portion 12a.

The distance between the planar illuminator 12 and the optical means 30 disposed in the liquid crystal panel 20 may be appropriately diffused by the sizes of the backlight 10 and the liquid crystal panel 20. For example, when the planar illuminator 12 is arranged on the rear side of the liquid crystal panel 20 of about 2 to 4 inches, the distance is about 1 to 3 mm in the light source arranging portion 12a and is about 0.5 to 1 µm at the end of the side that faces the light source arranging portion 12a. It is possible to easily adjust the distance by adjusting the thicknesses H and h of the planar illuminator 12, which are illustrated in FIG. 2.

Figure 4:
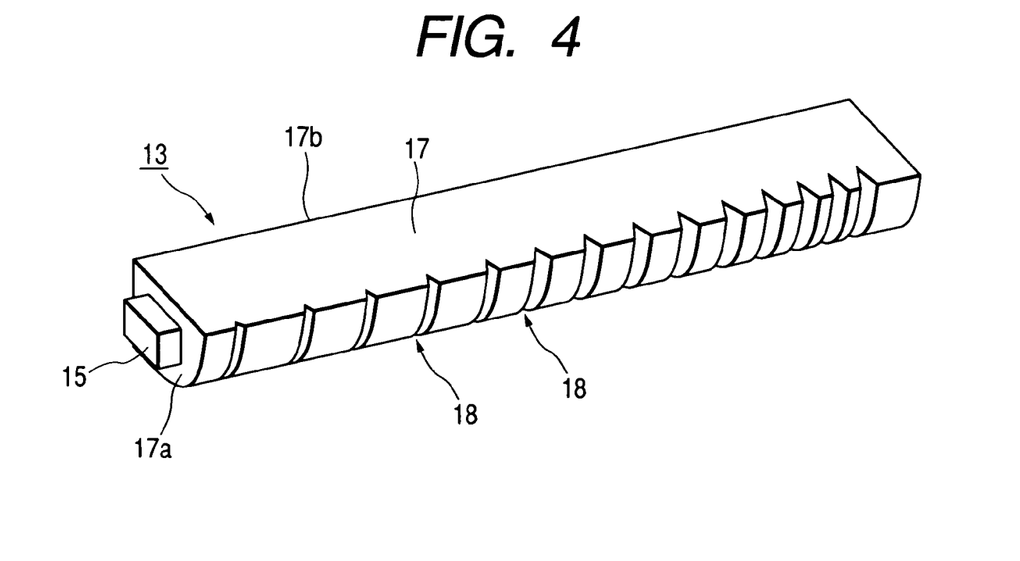
FIG. 4 is a perspective view of a light guider 17 illustrated in FIG. 1.

FIG. 4 is a perspective view illustrating the light source portion 13 illustrated in FIGS. 1 and 2 in more detail. The light source portion 13 illustrated in FIG. 4 includes a light guider 17 formed of substantially rod-shaped transparent resin and a light-emitting element 15 such as a white LED arranged in a section 17a of the light guider 17. as main components As illustrated in FIG. 4, one side (the rear side in Figure) of the light guider 17 is an emission surface 17b. The side opposite to the emission surface 17b is curved. A plurality of grooves 18 with wedge-shaped sections is formed along the curved surface so as-to extend to the peripheral direction of the light guider. As illustrated in FIG. 4, the grooves 18 are formed shallow to have the wide pitch in the section 17a where the light emitting element is disposed and are formed deeper to have a narrower pitch from the section 17a toward the direction where the light guider extends.

The light source portion 13 introduces the light emitted from the light emitting element 15 from the section 17a to the inside of the light guider 17, reflects the light transferred from the inside the light guider 17 by the plurality of grooves 18 formed in the side surface opposite to the emission surface 17b, and emits the reflected light from the emission surface 17b. In the light source portion 13 according to the present embodiment, the grooves 18 are formed so that the pitch and the depth thereof are controlled as mentioned above. Therefore, it is possible to uniformly emit light in the direction extending to the light guider 17 of the emission surface 17b. Since the side opposite to the emission surface 17b is curved, the distribution of the light emitted from the emission surface 17b in the thickness direction of the light guider is optimal when the light source portion 13 is assembled with the planar illuminator 12. To be more specific, the main components of the light emitted from the emission surface 17*b* are emitted to the front direction with respect to the emission surface 17*b*. The amount of the components emitted to the vertical tilted direction in the direction of the thickness of the light guider 17 is small. (In FIG. 2, most of the light emitted from the emission surface 17*b* is emitted to be almost vertical to the emission surface 17*b*. Therefore, the amount of the light emitted from the emission surface 17*b* to the illustrated tilted direction is relatively small.)

According to the present embodiment, the light source portion 13 is formed by assembling the light-emitting element 15 of the point light source with the rod-shaped light guider 17. However, instead of the light source portion 13, the light emission direction directs toward the reflection surface 12*b* so that an LED array (an element obtained by arranging a plurality of LEDs on a line or a surface) is disposed. A cold cathode fluorescence lamp 123 illustrated in FIG. 15 may be used.

In the backlight 10 having the above structure according to the present embodiment, as illustrated in FIG. 2, the light emitted from the light source portion 13 to the inside of the planar illuminator 12 is diffusively reflected by the reflection surface 12*b* of the planar illuminator 12. Therefore, the backlight 10 can uniformly illuminate the liquid crystal panel 20. The backlight 10 according to the present embodiment does not allow the light of the cold cathode fluorescence lamp 123 that is a light source to transfer inside the light guide plate 122 as the conventional backlight 120 illustrated in FIG. 15 does but reflects the light transferred in the air by the planar illuminator 12 thereby to illuminate the liquid crystal panel 20. Therefore, loss of light does not occur inside the light guide plate structurally. As a result, it is possible to use the light emitted from the light source portion 13 as illumination light with high efficiency and thereby to perform illumination with high brightness.

According to the present embodiment, the thicknesses of the planar illuminator 12 vary in the plane so that the reflection surface 12*b* is tilted. In order to obtain function of the backlight 10 according to the embodiment, the planar illuminator 12 preferably has only the reflection surface 12*b*. A thin planar illuminator slowly curved along the reflection shape 12*b* may be used. When the thin planar illuminator is used, it is possible to easily make the backlight 10 thin and light and thereby to easily make the liquid crystal display device thin and light.

<Shape of Reflection Surface of Planar Illuminator>

The shape of the reflection surface 12*b* of the planar illuminator 12 illustrated in FIG. 1 will now be described with reference to FIGS. 6 to 14.

[First Example of Shape]

Figure 6:
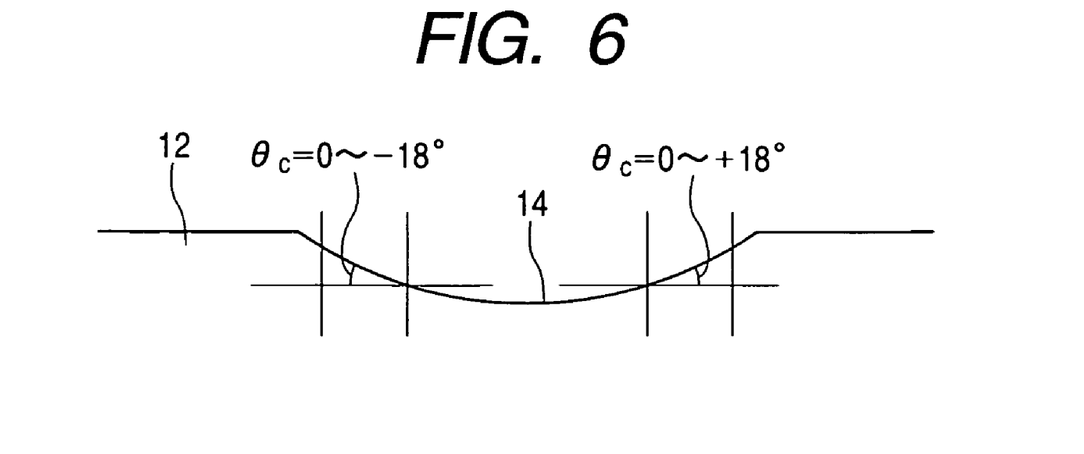
FIG. 6 illustrates a section of a concave portion according to a first example of shape.
Figure 7:
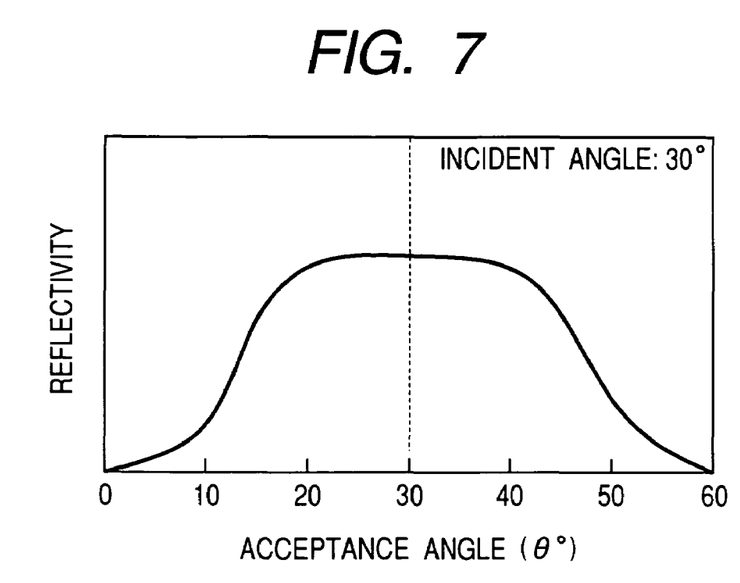
FIG. 7 illustrates reflection characteristics of a reflection surface having the concave portion illustrated in FIG. 6.

FIG. 6 is a sectional view illustrating a first example of the shape of the concave portions 14 formed on the reflection surface 12*b* illustrated in FIG. 3. FIG. 7 illustrates the reflection characteristic of the reflection surface 12*b* including the concave portions 14 having the shape illustrated in FIG. 6.

According to the present example, it is preferable that the concave portion 14 be randomly formed so that the depth thereof is in the range of 0.1 μm to 3 μm. It is preferable that the pitch between the adjacent concave portions 14 be randomly set in the range of 5 μm to 100 μm. The tilt angle of the inside surface of the concave portion 14 is preferably set in the range of −18° to +18°. The depth of the concave portion is the distance between the reflection surface 12*b* of the portion where the concave portions are not formed and the bottom of the concave portion. The pitch between the adjacent concave portions is the distance between the centers of the concave portions that are circular in a plane. As illustrated in FIG. 6, when a minute range where the width of an arbitrary portion inside the concave portion 14 is, for example, 0.5 μm is obtained, the tilt angle of the inside surface of the concave portion is an angle θc of a tilted surface in the minute range with a level surface (the surface of a base). For example, in FIG. 6, positive and negative of the angle θc is defined such that the right tilted surface is positive and the left tilted surface is negative with respect to a normal line formed on the reflection surface 12*b* where the concave portions are not formed.

In the present example of shape, in particular, it is very important that the distribution of the tilt angles inside the concave portion 14 is in the range of −18° to +18° and that the pitch between the adjacent concave portions 14 is randomly set for all of the directions of a plane. If the pitch between the adjacent concave portions 14 has regularity, interference color of light is generated thereby to color the reflected light. When the distribution of the tilt angles inside the concave portion 14 exceeds the range of −18° to +18°, the diffusion angle of the reflected light is too large. Therefore, reflection intensity deteriorates and images cannot be displayed with high brightness. (The diffusion angle of the reflection angle is 55° or more in the air.)

When the depth of the concave portion 14 is less than 0.1 μm, it cannot obtain a large enough light diffusion effect by forming the concave portion in the reflection surface. When the depth of the concave portion 14 is larger than 3 μm, the pitch must be made large in order to obtain the enough light diffusion effect, which may cause moiré fringes.

When the pitch between the adjacent concave portions 14 is less than 5 μm, processing time is extremely long. There is a problem in that a shape that enables a desired reflection characteristic to be obtained cannot be formed and interference light is generated. The pitch between the adjacent concave portions 14 is preferably in the range of 5 μm to 100 μm.

FIG. 7 illustrates a relationship between a light-receiving angle (unit: °) and brightness (a reflectivity, unit: %) when light is irradiated at an incident angle 30° with respect to the normal line direction of the planar illuminator 12 according to the embodiment and the light-receiving angle is changed from the perpendicular position (0°: the normal line direction) to 60° on the basis of 30° which is the regular reflection direction 30° with the display surface. As illustrated in FIG. 7, it is possible to obtain almost uniform reflectivity in a large light-receiving angle range that is symmetrical with respect to the regular reflection direction. In particular, the reflectivity is almost uniform in the light-receiving angle range of ±10° on the basis of the regular reflection direction. Therefore, it is suggested to display images with almost equal brightness in any direction in the viewing angle range.

The reflectivity can be made almost uniform in the wide light-receiving angle range that is symmetrical with respect to the regular reflection direction because the depth or the pitch of the concave portion 14 illustrated in FIG. 3 is limited to the above-mentioned range and because the internal surface of the concave portion 14 forms a part of a spherical surface. That is, the tilt angle of the internal surface of the concave portion 14, which controls the reflectivity of light is controlled to a uniform range because the depth and the pitch of the concave portion 14 are limited. Therefore, it is possible to limit the reflection efficiency of the reflection surface 12*b* to a uniform range. As a result, it is possible to control the light emission direction of the backlight and thereby to improve the brightness of a desired direction compared with the brightness in a conventional art without using the prism sheet that is essential to the backlight system in the conventional art.

[Second Example of Shape]

In the backlight 10 according to the present embodiment, it is possible to use a reflection surface having the reflection characteristic where a reflection brightness distribution is asymmetrical with respect to the regular reflection direction as well as the reflection surface 12b having the reflection characteristic where the reflection brightness distribution is almost symmetrical with respect to the regular reflection direction. The reflection surface having such a reflection characteristic will now be described with reference to FIGS. 8 and 9.

The reflection surface having the above reflection characteristic can be formed by changing the shape of the internal surface of the concave portion 14 illustrated in FIG. 3. That is, the reflection surface according to the present example has a structure where the plurality of concave portions 14 is formed on the reflection surface so as to be adjacent to and overlap each other like in the reflection surface 12b according to the foregoing embodiment, which is illustrated in the perspective view of FIG. 3. That is, only the shape of the internal surface of the concave portion 14 varies.

Figure 8:
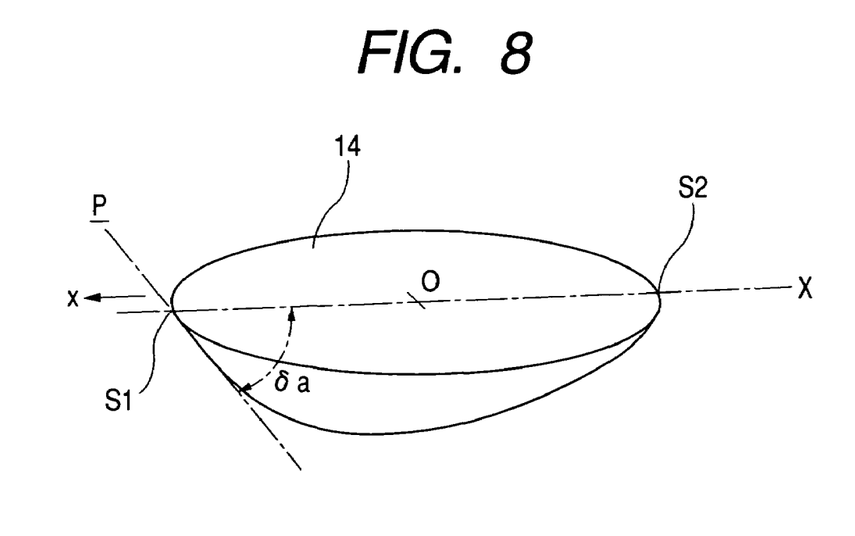
FIG. 8 is a perspective view of a concave portion according to a second example of shape.
Figure 9:
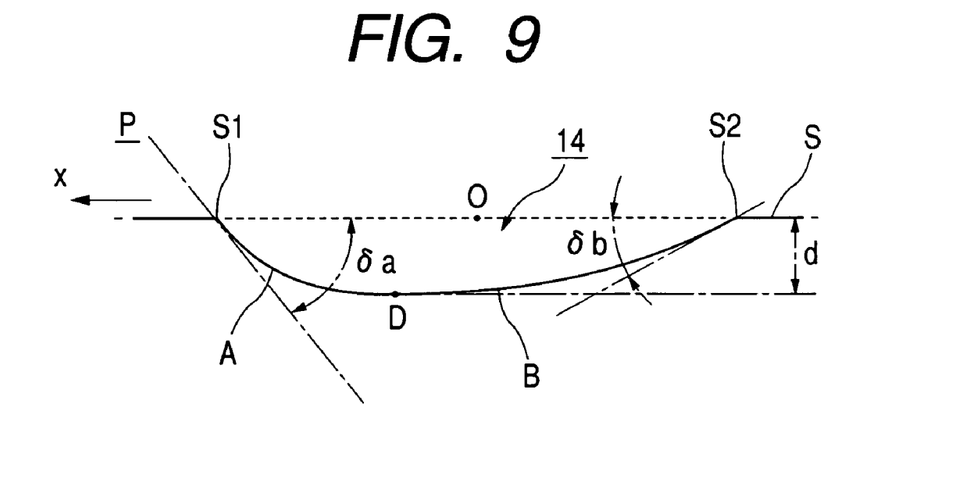
FIG. 9 is a sectional view along the longitudinal section X illustrated in FIG. 8.

FIGS. 8 and 9 illustrate one of the concave portions 14 in accordance with the present example, which illustrates a reflection brightness distribution asymmetric with respect to the regular reflection direction. FIG. 8 is a perspective diagram. FIG. 9 is a sectional view illustrating the specific longitudinal section X illustrated in FIG. 8.

In the specific longitudinal section X of the concave portion 14 illustrated in FIG. 8, the shape of the internal surface of the concave portion 14 consists of a first curve A that extends from a periphery S1 of the concave portion 14 to the deepest point D and a second curve B that extends from the deepest point D of the concave portion to another periphery S2 so as to be continuous to the first curve A. In the two curves, the tilt angle with the reflection film surface S is 0° in the deepest point D. The two curves are connected to each other. 'The tilt angle' is an angle with respect to the level surface (the reflection film surface S of the portion where the concave portions are not formed) of a tangent line in an arbitrary position of the internal surface of the concave portion in the specific longitudinal section.

The tilt angle of the first curve A with the reflection film surface S is larger than the tilt angle of the second curve B with the reflection film surface S. The deepest point D deviates from the center o of the concave portion 14 in the x-direction. That is, the average of the absolute value of the tilt angle of the first curve A with respect to the reflection film surface S is larger than the average of the absolute value of the tilt angle of the second curve B with the reflection film surface S. In the plurality of concave portions 14 formed on the surface of a diffusive reflector, the tilt angles of the first curves A with the reflection film surfaces S are irregularly scattered in the range of 1° to 89°. The averages of the absolute values of the tilt angles of the second curves B with the reflection film surfaces S in the concave portions 14 are irregularly scattered in the range of 0.5° to 88°.

The tilt angles of the two curves slowly change. Therefore, the maximum tilt angle δa of the first curve A (the absolute value) is larger than the maximum tilt angle δb (the absolute value) of the second curve B. The tilt angle of the deepest point D where the first curve A is connected to the second curve B with the base surface is 0°. The first curve A whose tilt angle has a negative value is slowly connected to the second curve B whose tilt angle has a positive value.

The maximum tilt angles δa in the plurality of concave portions 14 formed on the reflection surface 12b are irregularly scattered in the range of 2° to 90°. However, the maximum tilt angles δa of a large number of concave portions are irregularly scattered in the range of 4° to 35°.

The concave surface of the concave portion 14 according to the present example has a single minimum point D (a point on the surface where the tilt angle is 0°). The depth d of the concave portion 14 is formed by the distance between the minimum point D and the reflection film surface S of the base. The depths d are irregularly scattered in the range of 0.1 µm to 3 µm with respect to the plurality of concave portions 14.

According to the embodiment, the specific sections X in the plurality of concave portions 14 are in the same direction. The first curves A are arranged in the same direction. That is, the x-direction marked with the arrows in FIGS. 8 and 9 is directed to the same direction in any concave portions.

In the reflection surface 12b having such a structure, the first curves A in the plurality of concave portions 14 are arranged in the same direction. Therefore, the reflected light of the light incident from above the slope of the x-direction x (on the side of the first curve) of FIG. 9 on the reflection surface 12b is shifted more to the side of the normal line direction of the reflection film surface S than to the regular reflection direction. To the contrary, the reflected light of the light incident from above the slope opposite to the x-direction (on the side of the second curve B) of FIG. 9 is shifted more to the side of the normal line direction of the reflection film surface S than to the regular reflection direction.

Therefore, in the total reflection characteristics of the specific longitudinal section X, the reflectivity in the direction of light to be reflected by the surface around the second curve B increases. As a result, it is possible to obtain reflection characteristics where reflection efficiency in a specific direction is selectively improved.

Figure 10:
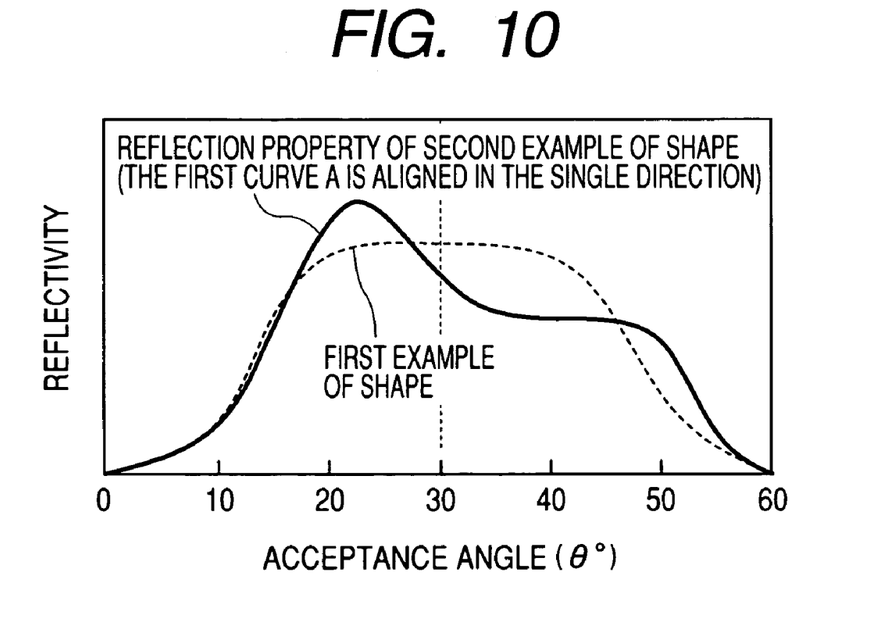
FIG. 10 illustrates reflection characteristics of a reflection surface having the concave portions illustrated in FIGS. 8 and 9.

According to the embodiment, the relationship between the light-receiving angle of the reflection surface 12b and the reflection angle of the plane of the reflection 12b is obtained the same as in the first example. The result is illustrated in FIG. 10. A relationship between the light-receiving angle and the reflectivity when the concave portion 14 having the section shape illustrated in FIG. 6 is formed is also illustrated in FIG. 10. As illustrated in FIG. 10, the reflectivity in the reflection angle smaller than the reflection angle 30° which is the regular reflection direction of the incident angle 30° considered as the structure of the present example is largest. Therefore, the reflectivity around the direction as its the peak increases.

According to the reflection surface 12b having such a structure, it is possible to effectively reflect and scatter the light emitted from the light source portion 13 and incident from the side on the reflection surface 12b to a panel direction. Simultaneously, the light reflected from the reflection surface 12b has directivity where the reflectivity thereof increases in a specific direction. Therefore, the emission angle of the reflected light emitted via the reflection surface 12b increases. Also, it is possible to improve emission efficiency at a specific emission angle. As a result, it is possible to control the light emission direction of the backlight without using the prism sheet that is essential in the conventional art and thereby to improve the brightness in a desired direction compared with that in the conventional art.

[Third Example of Shape]

A reflection surface having the following structure can be used as a reflection surface having a reflection brightness distribution asymmetric with respect to the regular reflection direction of incident light. The structure will now be described as a third example of a shape.

In the present example, it is possible to change the shape of the internal surface of the concave portion 14 illustrated in FIG. 3 like in the second example of shape. That is, in the present example, the reflection surface 12b also has the structure where the plurality of concave portions 14 is formed on the reflection surface so as to be adjacent to and overlap each other like in the reflection surface according to the embodiment, which is illustrated in the perspective view of FIG. 3. Therefore, only the shape of the internal surface of the concave portion 14 varies.

Figure 11:
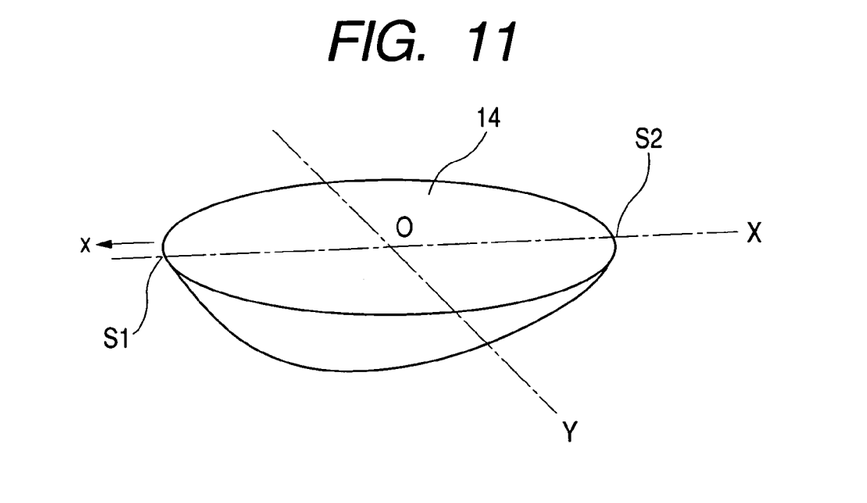
FIG. 11 is a perspective view illustrating a concave portion according to a third example of shape.
Figure 12:
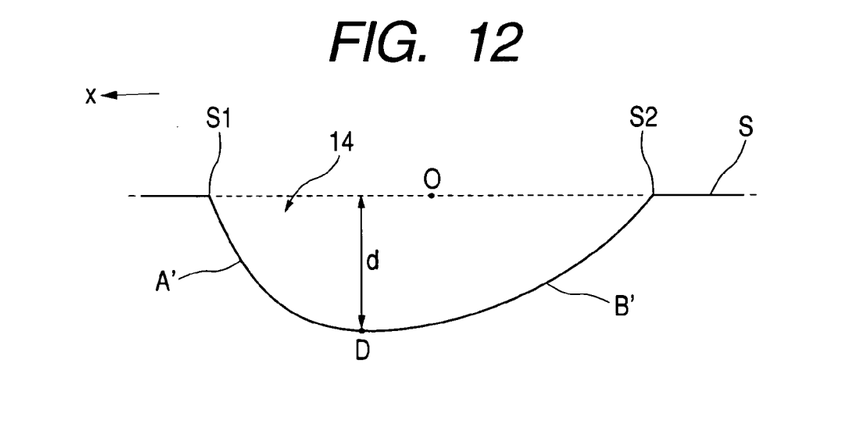
FIG. 12 is a sectional view along the longitudinal section X illustrated in FIG. 11.
Figure 13:
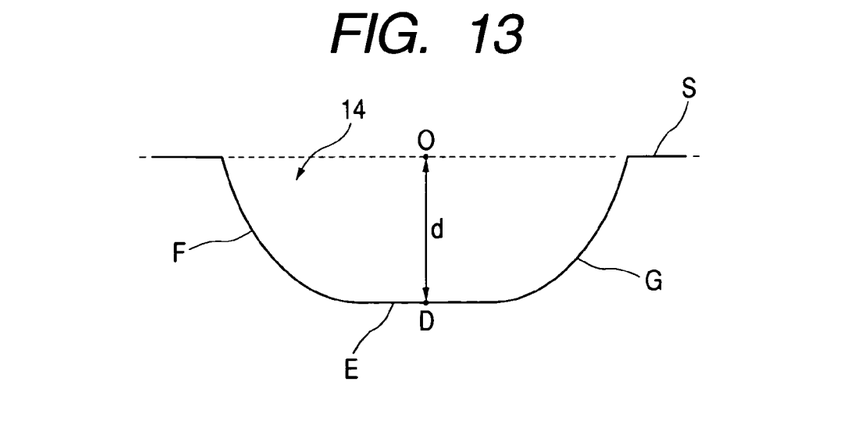
FIG. 13 is a sectional view along the longitudinal section Y illustrated in FIG. 11.

FIGS. 11 to 13 illustrate the internal shape of the concave portion 14 according to the present example.

FIG. 11 is a perspective view of the concave portion 14. FIG. 12 illustrates a section along the X-axis (the longitudinal section X) of the concave portion 14. FIG. 13 illustrates a section along the Y-axis (the longitudinal section Y) perpendicular to the X-axis of the concave portion 14.

As illustrated in FIG. 12, the shape of the internal surface of the concave portion 14 in the longitudinal section X consists of a first curve A' that extends from a periphery S1 of the concave portion 14 to the deepest point D and a second curve B' that is connected to the first curve and extends from the deepest point D of the concave portion 14 to another periphery S2. In FIG. 12, in the backward leaning first curve A' and the forward leaning second curve B', the tilt angle with respect to the surface S of the reflection film surface is 0° in the deepest point D. Therefore, the first curve A' is smoothly connected to the second curve B'.

'The tilt angle' is an angle of a specific longitudinal section with the level surface (here, the surface S of the reflection surface in the portion where the concave portions are not formed) of a tangent line in an arbitrary position of the internal surface of the concave portion.

The tilt angle of the first curve A' with respect to the reflection film surface S is larger than the tilt angle of the second curve B'. The deepest point D deviates from the center o of the concave portion 14 to the direction (the x-direction) extended to the periphery thereof along the X-axis. That is, the average of the absolute value of the tilt angle of the first curve A' is larger than the average of the absolute value of the tilt angle of the second curve B'. The averages of the absolute values of the tilt angles of the first curves A' in the plurality of concave portions 14 are irregularly scattered in the range of 2° to 90°. The averages of the absolute values of the tilt angles of the second curves B' in the plurality of concave portions 14 are irregularly scattered in the range of 1° to 89°.

As illustrated in FIG. 13, the internal surface of the concave portion 14 in the longitudinal section Y is symmetrical with respect to the center O of the concave portion 14. In the periphery of the deepest point D of the concave portion 14, a shallow curve E having a large radius of curvature, that is, close to a straight line exists. On either side of the shallow curve E, deep curves F and G having a small radius of curvature exist. The absolute values of the tilt angles of the shallow curves E in the plurality of concave portions 14 formed on the reflection surface 12b are mostly 10° or less. The absolute values of the tilt angles of the deep curves F and G in the plurality of concave portions 14 are irregularly scattered in the range of 2° to 90°. The depths d of the deepest points D are irregularly scattered in the range of 0.1 μm to 3 μm.

In the present example, in the plurality of concave portions 14 formed on the reflection surface 12b, the section directions that shape the longitudinal sections X are the same. The section directions that shape the longitudinal sections Y are the same. Simultaneously, the directions from the deepest points D to the peripheries S1 via the first curves A' are the same. That is, in the concave portions 14 formed on the reflection surface, the x-direction marked with the arrows in FIGS. 11 and 12 are the same.

In the present example, the directions of the concave portions 14 formed on the reflection surface 12b are the same. The directions from the deepest points D to the peripheries S1 via the first curves A' are the same. Therefore, in the reflection surface 12b, the reflected light incident from above the slope of the x-direction (on the side of the first curve A') in FIGS. 11 and 12 is shifted more to the normal line direction of the reflection film surface S than to the regular reflection direction.

To the contrary, the reflected light of the light incident from above the slope of the direction (on the side of the second curve B') opposite to the direction x in FIGS. 11 and 12 is more shifted to the reflection film surface S than to the regular reflection direction.

The longitudinal section Y that is at right angle to the longitudinal section X includes the shallow curve E with the large radius of curvature and the deep curves F and G with the small radius of curvature, which exist on both sides of the shallow curve E. Therefore, it is possible to increase the reflectivity in the regular reflection direction with respect to the reflection surface 12b.

Figure 14:
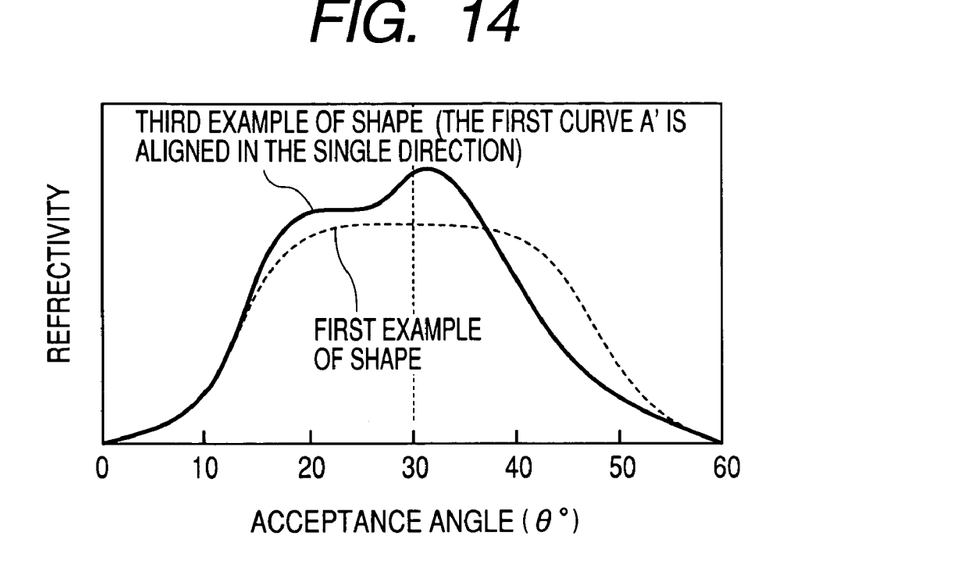
FIG. 14 illustrates reflection characteristics of a reflection surface having the concave portions illustrated in FIGS. 11 to 13.

As a result, as illustrated in FIG. 14, according to the total reflection characteristics in the longitudinal section X, it is possible to secure enough reflectivity in the regular reflection direction and to appropriately condense the reflected light to a specific direction. FIG. 14 illustrates a relationship between the light-receiving angle and the reflectivity in the reflection surface in the present example of shape like in the first example of shape. According to the reflection characteristics illustrated in the graph, the integrated value of the reflectivity in the reflection angle range smaller than the regular reflection angle 30° is larger than the integrated value of the reflectivity in the reflection angle range larger than the regular reflection angle. Therefore, the reflection direction tends to be shifted more to the normal line than to the regular reflection direction.

Therefore, according to the backlight including the reflection surface 12b, in which the concave portions 14 having the above structure are formed, due to the reflection surface 12b having the above shape, it is possible to effectively reflect and scatter the light emitted from the light source portion 13 and incident from the side. The light reflected to the reflection surface 12b has the directivity where the reflectivity thereof in a specific direction increases. Therefore, the emission angle of the reflected light emitted via the reflection surface 12b increases and it is possible to improve the emission efficiency in a specific emission angle. Therefore, it is possible to control the light emission direction of the backlight without using the prism sheet essential in the conventional art and to improve the brightness of a desired direction compared with that in the conventional art.

The shapes of the concave portions 14 illustrated in the examples of FIGS. 1 to 3 are examples of the shapes of the concavo-convex portions formed on the reflection surface 12b of the planar illuminator 12 according to the present invention. The scope of the present invention is not limited thereto.

<Optical Means>

Figure 5:
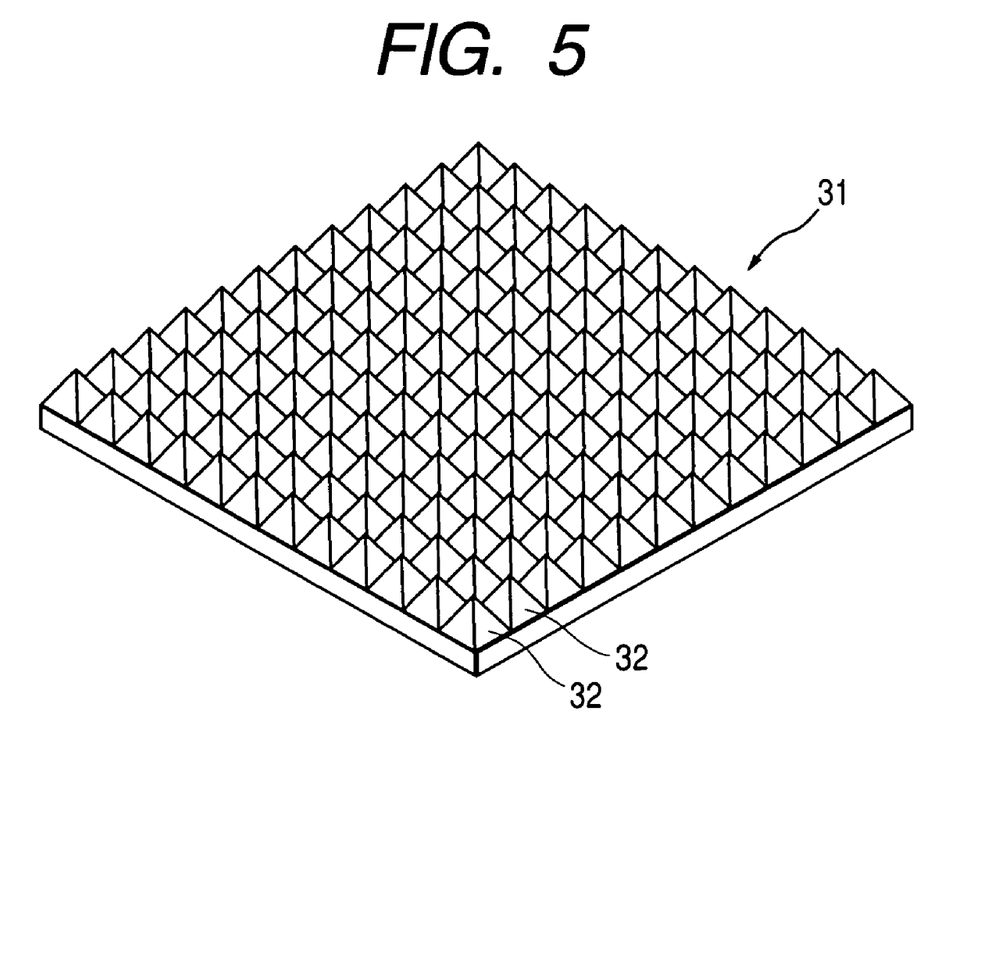
FIG. 5 is a perspective view of a prism sheet that can be used as optical means illustrated in FIG. 1.

For example, the prism sheet for controlling the directivity of the light reflected to the reflection surface 12b of the planar illuminator 12 can be used as the optical means 30 illustrated in FIGS. 1 and 2. FIG. 5 is a perspective view of a prism sheet that is suitable for the optical means 30 according to the present embodiment. In the prism sheet 31 illustrated in FIG. 5, quadrangular pyramid-shaped protrusions 32 are arranged on an upper surface in Figure. The prism sheet 31 changes the main traveling direction of the light incident from a lower surface thereby to condense the light to the direction perpendicular to the prism sheet 31. When the prism sheet 31 is included as the optical means 30, it is possible to condense the light emitted from the backlight 10 to the direction perpendicular to the liquid crystal panel 20 and make the light incident on the liquid crystal panel 20 by the optical means 30. Therefore, it is possible to provide a liquid crystal display device with an increased the brightness in the front direction of the liquid crystal panel 20, where a user is commonly positioned, and its displaying images can have substantially higher brightness.

Even when the protrusions 32 are quadrangular pyramid shaped and the light incident on the prism sheet 31 travels in plural directions in a plane, it is possible to effectively condense the light components that are almost perpendicularly incident on the respective side surfaces of the protrusions 32 in a plane.

The protrusion 32 is not limited to a quadrangular pyramid-shape as illustrated in FIG. 5 and may be a conical or a polypyramid-shape. It is possible to obtain the above effects by the prism sheet where the conical and polypyramid-shaped protrusions are formed. When the protrusions are polypyramid-shaped, the protrusions are preferably hexangular or octangular pyramid-shaped so that the protrusions can be continuously arranged thereby not to generate gaps in the prism sheet.

Though it is disadvantageous to make the illumination device thin and light compared with a case where the single prism sheet 31 illustrated in FIG. 5 is used, two prism sheets that overlap each other may be used as the optical means 30. Substantially triangular pyramid-shaped protrusions are arranged in parallel on one surface of each of the prism sheets, which is used for the conventional liquid crystal display device illustrated in FIG. 15.

The optical means 30 is not limited to the prism sheet for controlling the directivity of illumination light. A transparent resin sheet that disperses minute particles or a light scattering sheet obtained by forming a concavo-convex surface or minute slots on the surface or the inside of the transparent resin sheet may be used as the optical means 30. An optical sheet and the prism sheet can be assembled together. When the light scattering sheet is arranged between the backlight 10 and the liquid crystal panel 20, it is possible to improve the uniformity of the illumination light in a plane and to effectively prevent the shape of the reflection surface 12b from being recognized by the user after being transmitted.

<Liquid Crystal Panel>

The liquid crystal panel 20 has a structure where a liquid crystal layer 23 is interposed between an upper substrate 21 and a lower substrate arranged to face each other and the liquid crystal layer 23 is sealed by a sealant 24 disposed along the internal circumferences of the substrates 21 and 22 in the form of a planar frame. A liquid crystal control layer 26 is formed on the internal surface of the upper substrate 21 (on the side of the lower substrate 22). A liquid crystal control layer 28 is formed on the internal surface of the lower substrate 22 (on the side of the upper substrate 21).

The liquid crystal control layers 26 and 28 include an electrode or an alignment film for driving and controlling the liquid crystal layer 23 and preferably include a semiconductor device for switching the electrode. If necessary, the liquid crystal control layers 26 and 28 may include a color filter for displaying colors.

If necessary, the liquid crystal control layer 28 may include a reflection film, which is formed of a metal thin film having a high reflectivity such as Al and Ag for reflecting the external light incident on the liquid crystal display panel 20 or the illumination light of the frontlight 10. In such a case, it is preferable to include light scattering means for preventing the light reflected by the reflection film from being more intense in a specific direction thereby to deteriorate the quality of images displayed by the liquid crystal display device. A concavo-convex reflection film or a scattering film obtained by scattering resin beads having a refractive index different from that of a material forming a resin film into the resin film may be used as the light scattering means.

In the liquid crystal display device according to the present embodiment having the above structure, it is possible to obtain illumination light with high brightness by the backlight 10 having the structure where the light emitted from the light source portion 13 is reflected to the reflection surface 12b on the surface of the planar illuminator 12 as mentioned above and thereby to display images with high brightness. Also, it is possible to make the liquid crystal display device thin and light by the backlight 10 including the planar light illuminator 12 capable of being easily made thin and light compared with the conventional light guide plate. Furthermore, the optical means 30 may be included between the backlight 10 and the liquid crystal panel 20. Therefore, when the prism sheet is included as the optical means 30, it is possible to obtain the illumination light condensed to the front direction of the liquid crystal panel 20 and thereby to improve the substantial display brightness by increasing the brightness recognized by the user.

Furthermore, the reflection surface 12b of the planar illuminator 12 has diffusion reflection property. Therefore, when the liquid crystal panel 20 is transmissive, it is possible to diffusively reflect the external light that is incident from the outside on the liquid crystal panel 20 and passes through the liquid crystal panel 20 by the planar illuminator 12 and thereby to return the external light to the liquid crystal panel 20. As a result, it is possible to remarkably improve visual efficiency outdoors, which is a shortcoming of a transmissive liquid crystal display device in the conventional art.

As mentioned above, a light source and a planar illuminator for emitting light of the light source from one surface thereby to illuminate an illuminated object are included. The planar illuminator has a reflection surface, on which minute concavo-convex shapes are substantially randomly formed. Surface emission is performed by diffusively reflecting the light irradiated from the light source by the reflection surface. It is possible to easily make the planar illuminator having the same function thin and light compared with the conventional structure where the surface emission is performed by the linear light source or the point light source through the light guide-plate. Therefore, it is possible to make an illumination device thin and light.

What is claimed is:

1. An illumination device, comprising:
a light source; and
a planar illuminator for illuminating an illuminated object by emitting light of the light source from one surface,
wherein the planar illuminator has a reflection surface, on which minute concavo-convex shapes are substantially randomly formed,
wherein the light irradiated from the light source is diffusively reflected by the reflection surface thereby to perform surface emission,
wherein the light source is arranged at a side of the planar illuminator, and
wherein a reflection surface of the planar illuminator is a tilted surface that rises as the reflection surface becomes more distant from the light source.

2. The illumination device according to claim 1, wherein a prism-shaped prism sheet is disposed between the reflection surface of the planar illuminator and the illuminated object.

3. The illumination device according to claim 2, wherein the prism sheet controls the directivity of at least two light components, which travels in different directions in plan view.

4. The illumination device according to claim 3, wherein the prism sheet has a prism shape where a plurality of polypyramid-shaped or conical protrusions is formed.

5. The illumination device according to claim 4, wherein the vertical angle of the polypyramid-shaped or conical protrusion is in the range of 70° to 110°.

6. The illumination device according to claim 4, wherein a vertical angle of the polypyramid-shaped or conical protrusion is in the range of 80° to 100°.

7. The illumination device according to claim 4, wherein the protrusion has any one of a quadrangular pyramid, a hexangular pyramid, and an octangular pyramid shape.

8. The illumination device according to claim 1, wherein the light source is a cold cathode fluorescence lamp.

9. The illumination device according to claim 1, wherein the light source is an LED or an LED array.

10. The illumination device according to claim 1,
wherein the light source comprises a substantially rod-shaped light guider and a light emitting element disposed at an end of the longitudinal direction of the light guider,
wherein the light guider introduces light of the light emitting element from one end thereof to the inside thereof and emits the light to an emission surface disposed on one side,
wherein a side opposite to the emission surface of the light guider is curved, and
wherein a plurality of grooves extended to the peripheral direction of the light guider is formed along the curve.

11. The illumination device according to claim 10, wherein the pitches of the plurality of grooves formed in the light guider gradually become narrower from the side where the light emitting element is disposed and the depths of the grooves gradually become deeper.

12. A liquid crystal display device, wherein the illumination device according to claim 1 is disposed in the rear side of the liquid crystal panel.

13. An illumination device, comprising:
a light source; and
a planar illuminator for illuminating an illuminated object by emitting light of the light source from one surface,
wherein the planar illuminator has a reflection surface, on which minute concavo-convex shapes are substantially randomly formed,
wherein the light irradiated from the light source is diffusively reflected by the reflection surface thereby to perform surface emission, and
wherein a prism-shaped prism sheet is disposed between the reflection surface of the planar illuminator and the illuminated object.

14. The illumination device according to claim 13, wherein the prism sheet controls directivity of at least two light components, which travels in different directions in plan view.

15. The illumination device according to claim 14, wherein the prism sheet has a prism shape where a plurality of polypyramid-shaped or conical protrusions is formed.

16. The illumination device according to claim 15, wherein a vertical angle of the polypyramid-shaped or conical protrusion is in the range of 70° to 110°.

17. The illumination device according to claim 15, wherein a vertical angle of the polypyramid-shaped or conical protrusion is in the range of 80° to 100°.

18. The illumination device according to claim 15, wherein the protrusions have any one of a quadrangular pyramid, a hexangular pyramid, and an octangular pyramid shape.

19. The illumination device according to claim 13, wherein the light source is a cold cathode fluorescence lamp.

20. The illumination device according to claim 13, wherein the light source is an LED or an LED array.

21. The illumination device according to claim 13,
wherein the light source comprises a substantially rod-shaped light guider and a light emitting element disposed at an end of a longitudinal direction of the light guider,
wherein the light guider introduces light of the light emitting element from one end thereof to an inside thereof and emits the light to an emission surface disposed on one side,
wherein a side opposite to the emission surface of the light guider is curved, and
wherein a plurality of grooves extended to a peripheral direction of the light guider is formed along the curve.

22. The illumination device according to claim 21, wherein pitches of the plurality of grooves formed in the light guider gradually become narrower from a side where the light emitting element is disposed and depths of the grooves gradually become deeper.

23. A liquid crystal display device, wherein the illumination device according to claim 13 is disposed in the rear side of the liquid crystal panel.

24. An illumination device, comprising:
a light source; and
a planar illuminator for illuminating an illuminated object by emitting light of the light source from one surface,
wherein the planar illuminator has a reflection surface, on which minute concavo-convex shapes are substantially randomly formed,
wherein the light irradiated from the light source is diffusively reflected by the reflection surface thereby to perform surface emission,
wherein the light source comprises a substantially rod-shaped light guider and a light emitting element disposed at an end of a longitudinal direction of the light guider, wherein the light guider introduces light of the light emitting element from one end thereof to an inside thereof and emits the light to an emission surface disposed on one side, wherein a side opposite to the emission surface of the light guider is curved, and wherein a plurality of grooves extended to a peripheral direction of the light guider is formed along the curve.

25. The illumination device according to claim 24, wherein pitches of the plurality of grooves formed in the light guider gradually become narrower from a side where the light emitting element is disposed and depths of the grooves gradually become deeper.

26. The illumination device according to claim 24, wherein a prism-shaped prism sheet is disposed between the reflection surface of the planar illuminator and the illuminated object and the prism sheet controls directivity of at least two light components, which travels in different directions in plan view.

27. The illumination device according to claim 26, wherein the prism sheet has a prism shape where a plurality of polypyramid-shaped or conical protrusions is formed.

28. The illumination device according to claim 27, wherein a vertical angle of the polypyramid-shaped or conical protrusion is in the range of 70° to 110°.

29. The illumination device according to claim 27, wherein a vertical angle of the polypyramid-shaped or conical protrusion is in the range of 80° to 100°.

30. The illumination device according to claim 27, wherein the protrusions have any one of a quadrangular pyramid, a hexangular pyramid, and an octangular pyramid shape.

31. The illumination device according to claim 24, wherein the light source is a cold cathode fluorescence lamp.

32. The illumination device according to claim 24, wherein the light source is an LED or an LED array.

33. A liquid crystal display device, wherein the illumination device according to claim 24 is disposed in the rear side of the liquid crystal panel.

* * * * *

UNITED STATES PATENT AND TRADEMARK OFFICE
CERTIFICATE OF CORRECTION

| | | |
|---|---|---|
| PATENT NO. | : 6,971,782 B2 | Page 1 of 1 |
| APPLICATION NO. | : 10/716374 | |
| DATED | : December 6, 2005 | |
| INVENTOR(S) | : Hideaki Nagakubo et al. | |

It is certified that error appears in the above-identified patent and that said Letters Patent is hereby corrected as shown below:

In the Claims

Column 15, in claim 10, line 45, after "at an end of" delete "the" and substitute --a-- in its place.

Column 15, in claim 11, line 58, after "narrower from" delete "the" and substitute --a-- in its place.

Column 15, in claim 11, line 59, after "element is disposed and" delete "the".

Signed and Sealed this

First Day of May, 2007

JON W. DUDAS
*Director of the United States Patent and Trademark Office*